UNITED STATES PATENT OFFICE.

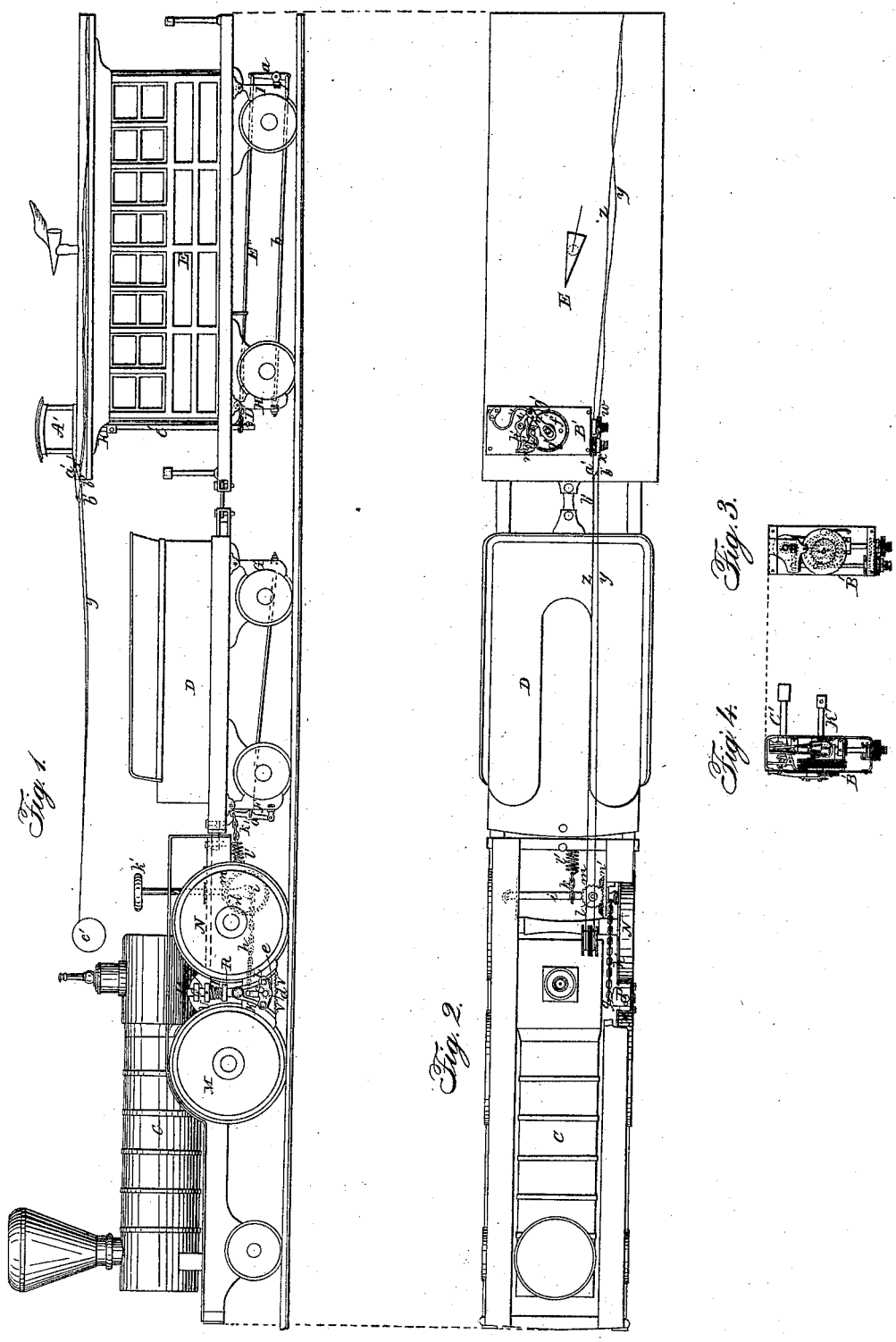

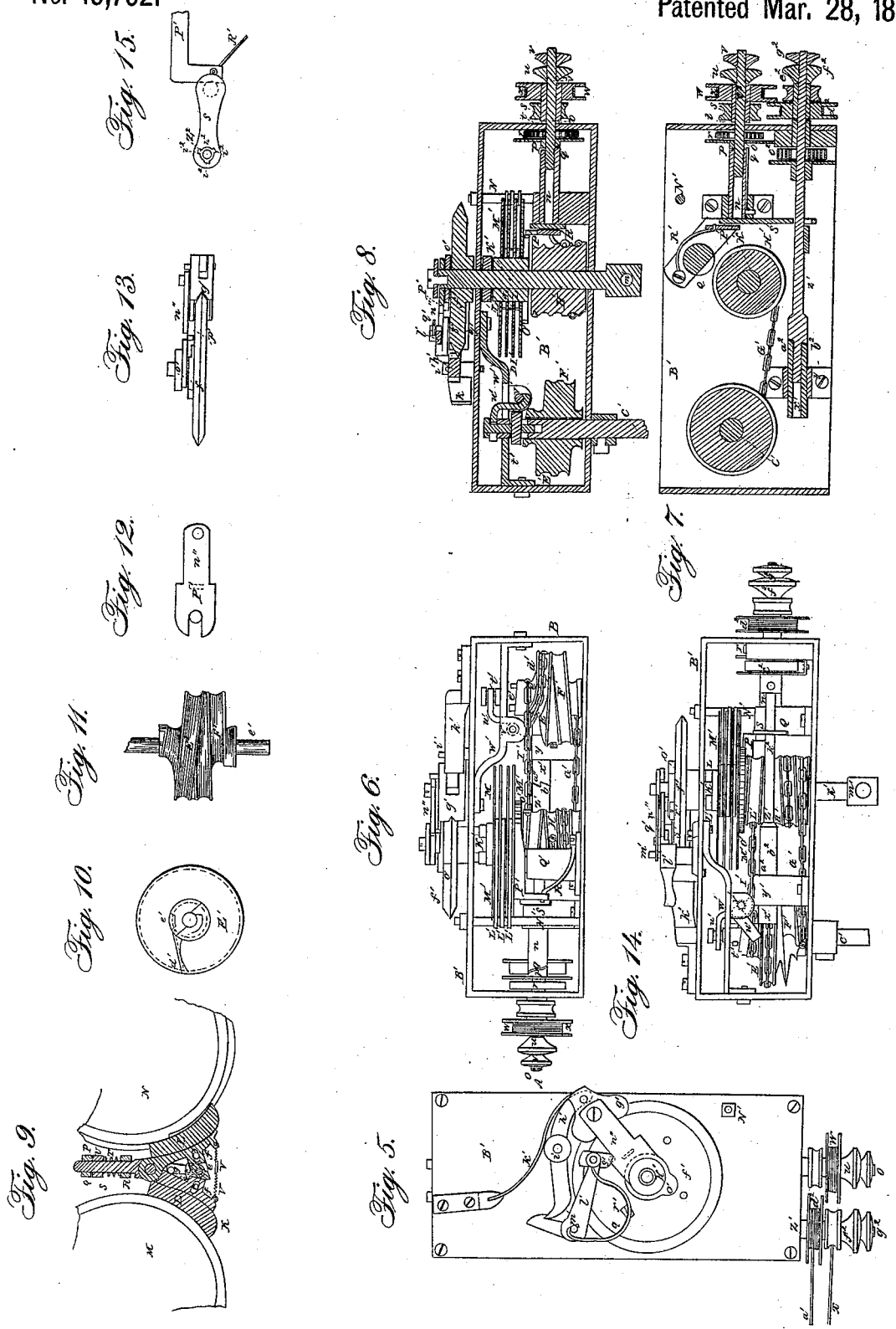

JOS. MARKS AND JNO. HOWARTH, OF SALEM, MASSACHUSETTS, ASSIGNORS TO WM. WHITING, OF ROXBURY, MASSACHUSETTS.

MACHINERY FOR OPERATING CAR-BRAKES.

Specification of Letters Patent No. 10,702, dated March 28, 1854.

*To all whom it may concern:*

Be it known that we, JOSEPH MARKS, late of Schenectady, in the State of New York, but now residing in Boston, in the county of Suffolk and State of Massachusetts, and JOHN HOWARTH, of Salem, in the county of Essex and State of Massachusetts, have invented new and useful Improvements in Machinery or Apparatus for Operating the Brakes of a Train of Railway-Carriages; and we do hereby declare that the same are fully described and represented in the following specification and the accompanying drawings, letters, figures, and references thereof.

Of the said drawings, Figure 1, denotes a side elevation of a locomotive steam engine, its tender, and a passenger carriage or car fitted with our invention. Fig. 2, is a top view of the same. Fig. 3, is a top view of the mechanism contained in the box or case, that is erected or placed on the roof of a passenger car. Fig. 4, is a side view of the same. Figs. 5, and 6, are views similar to Figs. 3, and 4, but made on a larger scale in order to more clearly exhibit the parts shown therein. Fig. 7, is a horizontal section taken on line A, B, of Fig. 6. Fig. 8, is a vertical section taken through the axes of the main spring barrel and the reversed fusees. Such other figures as may be necessary to a full explanation of our invention will be hereinafter referred to and described.

The principal object and purpose of our invention is to enable an engineer or conductor to speedily apply the brakes of a car or train of cars so as to arrest the movements of such car or train or cars, and thereby prevent casualties or accidents that frequently occur by reason of the inefficient power of the ordinary brake mechanism or the imperfect means of working the same.

In Figs. 1, and 2, of the drawings above mentioned, C, denotes the locomotive, D, the tender, and E, a passenger carriage. In the latter we have exhibited the carriage as running on four wheels. It may however be supported on a greater number, or be made with two or more truck frames in the ordinary way.

The brakes, H, I, are so applied according to a well known method, that when one set of them is drawn against its wheels the other set will be forced against its own wheels, this occurring by means of a brake lever, $a$, and a rod, $b$.

The brakes of the locomotive engine are represented at K, L, as arranged between and applied respectively to two driving wheels, M, N, that are situated on one side of the carriage. Such brakes and an apparatus for actuating them, like such as will be hereinafter described, may be applied to the opposite driving wheels if required. The two brakes are curved and hinged or jointed together at their upper ends, and they have between them a cam, $c$, that is placed on a shaft, whose journals, $d$, $d$, are sustained in two parallel bars or plates, $e$, $e$, which are arranged on opposite sides of the brakes and connected to them by screws that pass through slots, $f$, $f$, made through each brake, such slots being for the purpose of allowing the bar or bars to have a free sliding motion longitudinally with the screws, in order that the supporting fulcrum or shaft of the cam may not be stationary in position, but have lateral play so that the cam may always be made to act equally on both the brakes. This cam and the brakes are shown in vertical section in Fig. 9. When it is revolved against the brakes, it separates them and forces each against the periphery of its wheel, and if one brake strikes its wheel before the other is moved up to its wheel, the cam, by means of its movable bearings, will move laterally so as to force the other brake up against its wheel. A stationary shaft for the cam would not answer, because the rubbers or bearing surfaces of the brakes often wear unequally, or the rubbers may not be of equal thickness, in which case were the bearings of the cam made stationary, only one of the brakes would be likely to be pressed against its wheel.

The cam is rotated by means of an arm, $g$, (that extends up from the shaft of the cam) a chain, $h$, and a windlass shaft, $i$, the chain being wound on the windlass by the power of the engineer who turns said windlass by applying his strength to a hand wheel, $k'$. This hand wheel is placed on the top of a vertical shaft, $l$, that has a beveled gear, $m$, fixed on it. Such gear is made to engage with another beveled gear, $n'$, fixed on the shaft, $i$. A second chain, $k$, provided with a relieving spring, $l'$, so connects the windlass, $i$, and the brake lever, $a'$, of the tender brakes, F, G, that these brakes may also be operated by the windlass, *i*.

The brakes K, L, of the locomotive are hinged to a rod P, that slides freely in a vertical direction through projections or arms Q, R, extended from the carriage frame S, of the locomotive or a suitable plate bolted thereto. A helical spring T, is made to encompass the rod P, and to bear at one end against one of the studs Q, R, and at the other end against a slide U, which is confined to the rod P, by a set screw. This method of sustaining the brakes, viz, by means of a spring enables the vertical movement of the carriage body to take place without creating any material diminution of the pressure of the brakes against the wheels, it being understood that the boxes of the journals of the wheel shafts are supported by springs in the usual way. The two brakes K, L, have springs V, V, affixed to them below their cam, and to one of the slide bars *e, e;* such springs by their contractile power serving to draw the brakes away from the wheels, when the cam is being moved out of action against them.

The next, and most material portion of our invention, is that which is applied to each passenger car of the train and by which the engineer can control the brakes of the same, either causing such brakes to be thrown into action on their wheels, or out of action with respect to the same, as occasion may require. Such improved apparatus is intended only for use in cases of emergency, or when the train is in great danger. Under other circumstances the brakes are to be operated by the usual hand windlass, or in any of the well known methods. Ours is a safety apparatus, possessing great power and efficiency in operation in comparison to the ordinary brake mechanism applied to and under the platforms of a car. It is to remain quiescent while the cars are exposed to no material danger, but is to be ready to act so as to speedily arrest them under opposite circumstances, The power exerted by brakeman by the ordinary brake windlass of cars is not sometimes sufficient to arrest a train in season to avoid accident, and besides in cases of imminent danger or risk of life, even such is rarely and properly put in action. In order to aid in the stoppage of a train, it is frequently the case, that the motion of the engine piston is reversed and made to work against the steam. This is a hazardous operation, when the train is at a high velocity as it may produce breakage of the cylinder connecting rod or some other part of the engine. It is therefore desirable to have a great force or power stored up prepared to act on the instant, and under the control of the engineer on the engine or a conductor or officer on the train. It is also desirable to have it so applied to each car as not only to enable the engineer or a person on the engine to control it but also to enable it to be put in action by a person on either car as well as to have it set in action by a car whenever such may become unshackled or disconnected from the rest while the train may be in motion. Our invention possesses all these advantages as well as others not necessary to be enumerated.

On the top of each car we place a box or case A', made to cover a frame B', and the mechanism supported by and in it. From this frame a windlass shaft C', is extended downward vertically and is connected to the brake lever *a*, by means of a chain D', or a chain and slide rod E'', or the mechanism equivalent therefor, the same being so that when the windlass shaft is turned around in one direction, the chain shall be wound on it and such a draft created on the chain as to cause the brake lever to be actuated so as to force or move the brakes into contact with the peripheries of their wheels. The upper portion of the shaft C', is provided with two fusees E', F', the groove of one of which is made to run in a reversed direction to that of the other. A top view of the upper of these fusees is given on an enlarged scale in Fig. 10, while a side view of both of them is exhibited in Fig. 11. They are similar to one another but they are made to stand reversed. From the lower one, a chain G', is fastened and led and fixed to a grooved windlass barrel H', arranged as seen in the drawings. There is also another chain I', that extends from the windlass barrel to the upper fusee, and on the opposite side of said barrel; the two chains being made to play or wind in two helix grooves cut around in the periphery of the windlass barrel in opposite directions. The shaft K', of the windlass barrel has a series of two or more spiral springs L', L', L', which are placed between and kept apart by disks or plates M', M', M', the opposite or outer ends of the springs being fastened to a post N' that extends from the top to the bottom plate of the frame B'. A ratchet wheel O' is placed and fastened on the shaft of the windlass barrel, and it has a retaining pawl lever P', which turns upon a fulcrum at the top of a post Q', and is forced up to the periphery of the ratchet by a spring R'. The rear arm of the lever pawl P', is curved around against the inner side of a locking arm S', which will be hereinafter described.

The lower arm of the shaft, K', is provided with a key or a wrench hole, *m'*, into which a wrench or bar may be inserted for the purpose of enabling a person to rotate the shaft and the windlass barrel, H', and so as to coil up the springs thereof. We employ two or more springs and the guide and separating disks, in preference to a single spring, because should one of these springs break or get out of working order, the rest would be and should be made to be sufficient to operate the brakes, whereas, had we but a single spring it might break or be found broken at a time when the apparatus might be required to be used.

The locking arm, S', is attached to the inner end of a tubular shaft, n, which receives through it a windlass shaft, o. This latter runs through the tubular shaft and carries a locking cam, p, that is fixed on it. Such cam works against a similar cam, q, made upon the end of the tubular shaft, these cams being so formed as to cause the tubular shaft to be moved longitudinally made upon the end of the tubular shaft, is turned in one direction, or in that in which it is rotated by the action pull or draft of the main applying line to be hereinafter described. A spiral spring, r, fixed to the shaft and the end of the frame, B', serves to reverse the rotation of the shaft after the force on the main applying line has ceased to act.

There is on the shaft, o, another short tubular shaft, (s,) which plays or rests against a shoulder, t, and is forced up against the same by a screw nut, u, working on a screw, $v^3$. Such screw nut is provided with a clamp nut, v, whose office is to prevent it from being turned back on the shaft. The tubular shaft, s, has a small windlass pulley, w, fixed on it, around which is wound a branch cord or line, x, leading from the main applying line, y, the end of the cord before winding it around the pulley being inserted in or through a hole made through one of the flanges of the groove of the pulley or being otherwise so fixed to the pulley as to be capable of being separated from it (when unwound from it,) by a power of draft on the rope such as would not be sufficient to break the rope.

To operate our apparatus, we employ two main lines or ropes, y, z, extending from the engine and over each car of the train. One of these lines, viz, the line, y, we term the "main applying line," and because by means of it, the engineer is enabled to set in action the machinery which applies or forces the brakes against the wheels. The other line or rope, we term the "main relieving line," and this because the office of this line is to enable the engineer to actuate the relieving mechanism, or that which relieves the brakes from the pressure induced by the set of spiral springs, L', L', L'. The branch relieving and applying lines, x, and a', are secured to the main lines by screw clamps, b', b', or in any proper way.

When the engineer pulls on the main applying line, or by means of a windlass, c', or any other suitable mechanism creates a draft on it, the windlass shaft, o, will be rotated and produce a longitudinal motion of the tubular shaft, n, whereby the arm, S', on such shaft will be forced against the lever pawl, P', so as turn it out of engagement with the ratchet, O'. This will set free the springs, L', L', L', so that they will rotate the windlass barrel H', which will create such a rotation of the windlass shaft, C', as will throw the brakes into action on the wheels.

The upper fusee, at its neck or upper part is constructed of much smaller diameter than it is at its base, and by a sudden and long sweep, d', e', the neck portion of the groove is joined to the base part of it. The object of this peculiar construction is to enable the shaft, C', to be rotated with a very quick velocity, while the slack of the chain, D', is being taken up, and as soon as this is effected for the base portion of the groove to be suddenly brought into action. While the slack of the chain is being taken up, it becomes necessary to ease down, or check the power or pressure of the springs, L', L', L', otherwise the momentum of the sudden expansion of them, if allowed to operate with full force on the chain, D', might break it. For this purpose we combine with the main spring shaft, K', an automatic or self acting friction brake apparatus, the construction and peculiar operation of which we shall now proceed to describe.

On the upper end of the shaft, K', we affix a wheel, f', against whose periphery, a rubber or brake, g', is placed. This latter is jointed to one end of a lever h', that turns horizontally on a fulcrum, i', and is formed as seen in Fig. 2, of the drawings. The brake end or arm of the lever, h', is pressed toward the wheel f' by a spring k' the opposite arm of the said lever h' being made to act in conjunction with a catch lever, l', which is shaped and made to turn on a fulcrum, m', as seen in the drawings.
There is a slide, n'', jointed to the brake and forked at its other end so as to embrace and slide on the shaft, K'. Fig. 12, shows a top view of this slide, while Fig. 13, is a side view of the slide, the brake, g', and the wheel, f'. On the top of the wheel, f', and between it and the slide, n'', there is a cam, o', which at a proper time is carried around (by the wheel) against a stud, p' (projecting from the under side of the slide n'',) and so as to move the slide in such manner as to force the brake, g', out of contact with the wheel, f'. As soon as this takes place, the catch lever, l', actuated by a spring, q', catches the tail end of the lever, h', and holds the brake out of contact with the wheel, not only while the power of the main springs is being exerted on the car wheel brakes, but while the main springs are being rewound, it not being desirable to operate against the friction of the brake, g', while the shaft, K', is being turned so as to wind up the main springs.

Just previous to the completion of the winding or coiling up of the main springs, a small stud or screw head, r', fixed in the upper surface of the wheel, f', is brought to bear against a tripping cam s' (fixed on the end of the larger arm of the catch lever, l') and by its pressure against such, so moves the lever, l', as to disengage the brake lever h', and permit the brake, g', to be thrown against the wheel f', by the spring, k'.

When the wheel, f', is rotated in the opposite direction, the stud, r', meets the tripping cam, which gives way under the pressure of it, and allows the stud to pass by it, the tripping cam being so made and applied to the lever as to operate in such manner. The tripping cam or lever is a contrivance well known to mechanics and used for such purposes.

While the car brakes may be exerting their full pressure on the wheels, it will often be desirable to suddenly remove such pressure, in order that the cars or train may be again set in motion; this could be done by rewinding the main springs, but it will be evident to any one conversant with railway matters, that such would be an operation, which would require too much time.

We therefore combine with the fusees and shaft, C', an apparatus by which they may be so disengaged from one another as to allow the shaft to freely rotate backward, and thus relieve the car brakes from the strain of the chain D'. To this end, the shaft, C', is made to freely revolve in the fusees, and such shaft and fusees are provided with a clutch, t', the movable portion of which is suspended on one arm of a bent lever, u', which turns on a fulcrum, v', that is supported by a projecting arm, w'.

In Fig. 14, we have represented a front side elevation of the mechanism contained in and on the frame, B', a rear side elevation of it being shown in Fig. 4. The tail or lower arm of the lever, u', is pressed laterally by a sliding shaft, x', which is supported by a post, y', and is a tubular shaft made substantially like the tubular shaft, n, hereinbefore described.

The shaft, x', is combined with a windlass shaft, z', and they are respectively provided with locking cams, $a^2$, $b^2$, as are the shafts, n, o, hereinbefore described. The windlass shaft z', has applied to it a spiral spring, $c^2$, a pulley $d^2$, and a friction tubular shaft $e^2$, a screw nut, $f^2$, and a clamping nut, $g^2$, all of which are substantially like those hereinbefore explained as applied to the windlass shaft, o.

The branch line or cord, a', from the main relieving line, z, winds around and is applied to the pulley $d^2$, in the same manner as the line x is applied to the pulley, w.

If the engineer pulls, or creates a draft on the main relieving line, the shaft, C', may be unclutched from the fusees, and the wheels relieved from the pressure of the brakes. The clutch will remain out of engagement with the fusee until the rewinding of the main springs takes place, the clutch dropping into engagement with the fusee, a little before the completion of such operation.

The locking arm, S', hereinbefore referred to, is formed as seen in side view in Fig. 15. It is made with a circular hole, $h^2$, and three or any other suitable number of recesses $i^2$, $i^2$, $i^2$, leading from the same. The shaft, z', passes and slides through the hole, $h^2$, and is provided with a spline or feather, $k^2$, that extends from it, and has a transverse section, which enables it to enter any one of the recesses $i^2$, $i^2$, $i^2$.

The object of the locking arm, S', and the projecting feather or key, $k^2$, is to prevent the unclutching of the shaft, C', from its fusees, when a car becomes unshackled, or disengaged from the rest of the train. It will readily be seen that when such an accident, as such a separation of a car from the rest of the train, occurs, both the main applying and relieving lines will be strained. The moment this takes place, the windlass pulleys, w and $d^2$, will be set in revolution and the locking arm, S', moved laterally on the shaft, z', whose feather or key, $k^2$, will thus be made to enter one of the recesses, $i^2$. When this takes place the further revolution of the shaft, z', will be stopped. Consequently the fusees will not be unclutched from the shaft, C', the car brakes being thrown into action so as to stop the car. The extra draft on the main applying and relieving lines will cause the branch lines to run off the pulleys, and thus the disengaged car will not only have its brakes applied to its wheels, but it will be separated from the branch lines.

It will be perceived by our present invention, that, the operation of winding up the main spring or springs is not performed by means of windlasses placed on the locomotive engine, and connected to the barrels of the springs of the several cars, but it is required to be accomplished by a person on each car, or by one person at intervals while going through the train. Also that the apparatus by which the wheels are suddenly relieved from the pressure of the brakes is entirely different in its arrangement, application and construction, from a windlass or set of windlasses applied on the locomotive engine, and connected with the spring barrels of the several cars by so many lines. By means of our invention, the engineer when on the engine has it in his power to either instantly set in full operation the power by which the brakes are forced or drawn against the wheels, or when such is in operation he can do what will instantly cause the said pressure of the brakes to be removed from the wheels and without rendering it necessary in the mean time to wind up the main spring or springs, an operation which would consume too much time. This latter operation is to be subsequently performed, and by a person applying a key or lever to, and rotating each of the shafts, K', of the several cars. Thus it will be seen that one person can have the power of instantly applying all the brakes of the train, and by an apparatus, that is not affected by the usual lateral or longitudinal movements of cars in a train, one that will operate just as well while the train may be going backwards, as when it may be moving forward on the railway.

Having thus described the nature and performance of our invention, what we claim is as follows:

1. We claim the improvement of so adjusting the relative lengths of the relieving branch lines of a train of two or more cars by means of adjustable pulleys and connecting these lines by a single main line—that all the relieving mechanisms of such train may be put in operation in such manner that the brakes of the several cars of the train may be either simultaneously or in succession thrown out of action on the wheels or relieved of the pressure induced by the main spring or springs as hereinbefore specified.

2. Heretofore we have constructed the main spring of a single coil, bar, or plate of metal which being necessarily of a high temper in order to give it sufficient strength, and prevent it from setting, it is liable to break from a variety of causes, among others, sudden changes of temperature, and when broken, the apparatus is entirely disabled, and the lines of those depending upon its efficiency thereby endangered; to such a spring as this we make no claim, neither do we claim a spring simply composed of two or more bars or plates of metal; but what we do claim as our invention is the combination and arrangement of a series of independent springs, with the mechanism for applying the force produced by their tension to press the brake rubbers upon the wheels, this mechanism being put in action either from the locomotive or from the separate cars by the engineer or other person having it in charge, or automatically, and with certainty and promptness to detached cars whenever one or more of them become detached from the train either by design or accident.

3. We also claim in combination with the main spring shaft and the frame, the apparatus by which the power of the main spring is prevented from acting too suddenly or so as to rupture or injure the brake chain when the slack of it is taken up as stated—meaning also to claim the combination of parts or elements constituting such apparatus; the same consisting of the wheel $f'$, the rubber $g'$, the lever, $h'$, spring, $k'$, catch lever, $l'$, slide $n''$, with its stud, $p'$, cam, $o'$, spring, $q'$, and the tripping cam, $s'$, as hereinbefore specified.

4. We also claim the mechanism for disengaging the retaining pawl of the ratchet, that is to say, the tubular shaft or sleeve $n$, and its oblique end $q$, acting as a stop, in combination with the windlass shaft $o$, and its oblique end $p$, to act in connection with the oblique end of the sleeve, as described, so that in case the shaft $o$, should be turned back by the movement of the spring with too much force, its screw may not bind in the screw of the sleeve, and thus prevent the apparatus from working.

5. We also claim the improvement of so combining the windlass shaft, $C'$, with the fusees or apparatus by which it is put in rotation that it may be disengaged therefrom, in order to relieve the car wheels from the pressure of the brakes, without rendering it necessary to do so by rewinding the springs.

6. We also claim the combination of the key or feather, $k^2$, and the locking arm, $S'$, (or their equivalents), with the shafts, $n$, and, $z'$, the same being for the purpose as hereinbefore specified.

7. We also claim the improvement by which each windlass or pulley shaft, $o$, or $z'$, and its main line, $y$, or $z$, is connected, viz, by a branch line, $x$, or $a'$, loose pulley, and friction screw or contrivance as combined together and with the main line and windlass shafts and made to operate in manner substantially as specified.

In testimony whereof we have hereto set our signatures this twenty-fourth day of August A D 1853.

JOSEPH MARKS.
JNO. HOWARTH.

Witnesses:
R. H. EDDY,
LUKE BEMIS.